Dec. 22, 1925.

E. J. GULICK 1,567,005

KNOB GAUGING MACHINE FOR MUSICAL INSTRUMENTS

Original Filed Nov. 6, 1922   2 Sheets-Sheet 1

Witness:
C. A. Towsley.

Inventor
Edward J. Gulick
By Louis C. Vanderlip,
Attorney

Dec. 22, 1925.  
E. J. GULICK  
1,567,005  
KNOB GAUGING MACHINE FOR MUSICAL INSTRUMENTS  
Original Filed Nov. 6, 1922  2 Sheets-Sheet 2
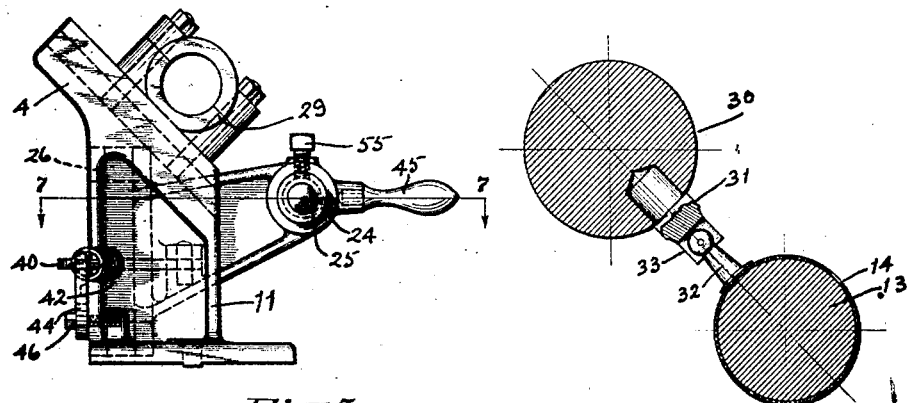
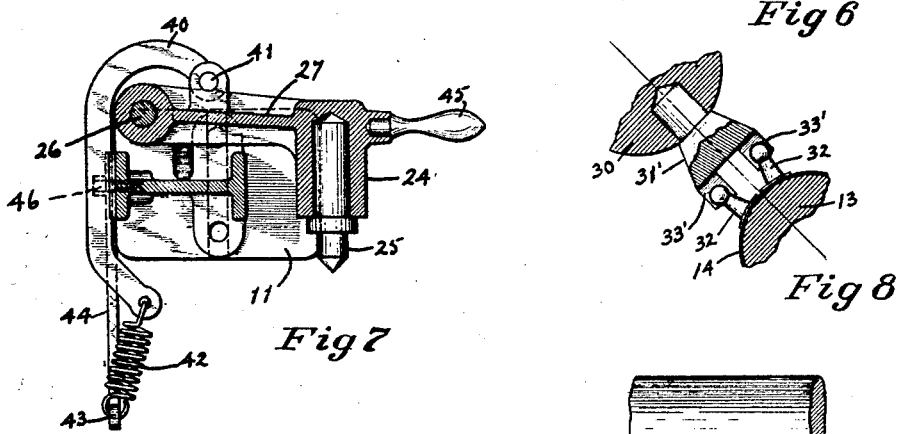
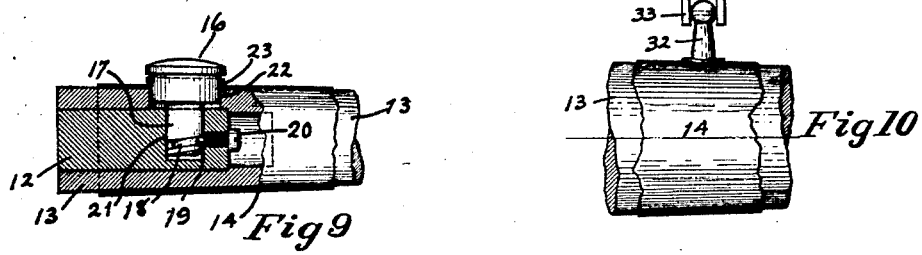
Witness  
C. A. Townsley
Inventor  
Edward J. Gulick  
By Louis C. Vanderlip  
Attorney Patented Dec. 22, 1925.

1,567,005

UNITED STATES PATENT OFFICE.

EDWARD J. GULICK, OF ELKHART, INDIANA, ASSIGNOR TO C. G. CONN, LTD., OF ELKHART, INDIANA, A CORPORATION OF INDIANA.

KNOB-GAUGING MACHINE FOR MUSICAL INSTRUMENTS.

Application filed November 6, 1922, Serial No. 599,243. Renewed May 21, 1925.

*To all whom it may concern:*

Be it known that I, EDWARD J. GULICK, a citizen of the United States, residing in the city of Elkhart, county of Elkhart, Indiana, have invented certain new and useful Improvements in Knob-Gauging Machines for Musical Instruments, of which the following is a specification.

The invention relates to improvements in machines for manufacturing instrument bodies.

It is an object of the invention to provide a machine in which the location of knobs or other projections extending outward from an instrument body such as a saxophone may be suitably gauged so as to make sure that other parts to be connected with said instrument body may be properly associated in fixed or movable relation with said knobs.

It is also an object of the invention to provide a machine of this kind in which this gauging operation of a relatively large number of knobs at irregular but fixed distances from each other, axially or circumferentially, may readily be gauged by moving the instrument body relatively to a gauge carrier on which a corresponding number of gauging devices is located.

It is also an object of the invention to provide a machine of this kind in which the instrument body can readily be placed into operative position and in which the movement of the body relatively to the gauge carrier may be used to gauge the knobs.

The invention also has the object to removably seat gauges or gauge plugs in a shaft which is rotatably carried in the machine and which may be adjusted with respect to the support of an instrument body so as to permit of the gauging of instrument bodies of different taper, knob-arrangement, or length.

The invention also has the object of providing an improved connection between an instrument body and its support in a machine, so as to facilitate the release of the body from the mandrel or the positioning of the body on the mandrel.

With these and numerous other objects in view an embodiment of the invention is described in the following specification and illustrated in the accompanying drawings in which:

Fig. 5 is an end elevation of a bearing structure;

Fig. 6 is a fragmentary section through the instrument body and mandrel with a gauge plug in operative position;

Fig. 7 is a horizontal section on the line 7—7 of Fig. 5;

Fig. 8 is a fragmentary section similar to Fig. 6, showing a modified construction of a gauge plug;

Fig. 9 is a sectional view on a larger scale through a support for the instrument body, and Fig. 10 is a fragmentary front elevation of the gauge carrier and gauge plug in engagement with a knob.

Figures 1, 2, 3, 4:
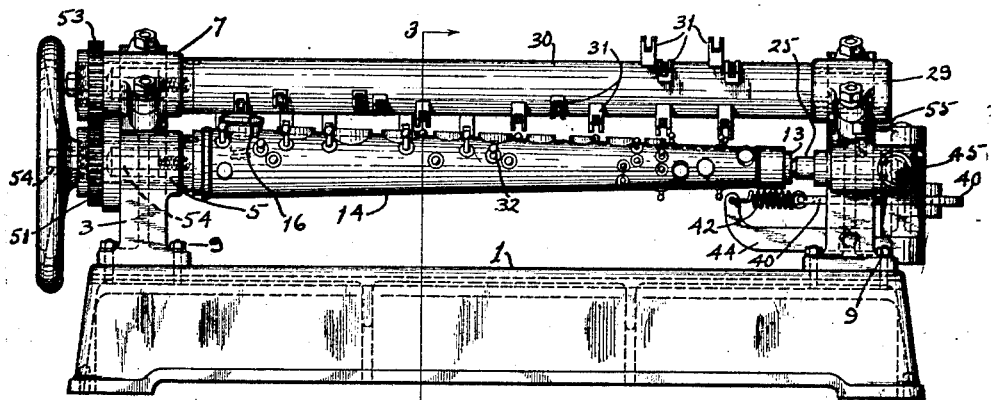
Fig. 1 is a front elevation of the machine.
Fig. 2 is an end elevation of the same.
Fig. 3 is a vertical section on line 3—3 of Fig. 1.
Fig. 4 is a plan view in direction of the lines 4—4 of Fig. 2.

The bed of the machine is a casing structure 1 which is closed at the top and preferably open at the bottom suitably reinforced by transverse ribs and provided with extensions which serve as legs for the machine. The top wall of the bed 1 has a horizontal longitudinal T-groove 2 to receive heads of clamping bolts for adjustably locating bearing structures in which the rotatable parts of the machine are movably supported. The left hand bearing structure comprises a bracket 3 with a slanting head 4 and an extension which terminates in a bearing 5 for one end of the mandrel. The slanting head has a central groove 6 in which is slidably supported a bearing 7, this bearing being adjustable to the desired position on the head by means of headed clamping screws 8, which enter the T-groove 6. It will be seen from this description that the relation between the axis of the mandrel and the axis of the plug carrying shaft or gauge carrier may be adjusted to suit the requirements of the case. The bearing bracket 3 is provided on its base with lugs through which the clamping bolts 9 extend into the T-slot 2 of the base 1, thereby making an adjustment of the bearing bracket longitudinally of the bed feasible and locking the bearing in adjusted position.

The bearing structure, generally designated at 11, for the other end of the machine is similarly constructed and is also longitudinally displaceable on the bed and may be retained in adjusted position by similar clamping bolts 9.

The bearing 5 serves for rotatably supporting a stub shaft 12 to which the rear end of a tapering mandrel 13 is fixed. This mandrel, as illustrated in Fig. 9 has at its rear end a cylindrical axial bore whereby it may be fitted to the stub shaft 12. The mandrel 13, having a contour so as to support thereon the saxophone body 14 is united detachably with said body and with the stub shaft 12 through a plug including a head 16 and a reduced part 17. The reduced portion of the plug is at its lower end equipped with a screw thread 18 adapted to receive the point 19 of a set screw 20, which is inserted through the end of the stub shaft. If, therefore, the reduced portion 17 of the plug is introduced into the bore 21 of the stub shaft 12, and if the plug is rotated, the engagement of the screw pin 19 will cause the plug to be tightened and to be firmly seated within the bore, and removal of the plug can only be effected by rotating it in a certain direction.

The enlarged head 16 of the plug is received within the enlarged bore 22 of the mandrel which has the same diameter as a flanged opening 23 in the saxophone body, whereby these elements,—the stub shaft 12, the mandrel 13 and the instrument body 14—are maintained in proper relation during the operation of the machine.

The bearing bracket 11 at the opposite end of the machine has an extension 24 to receive a tail bearing pin or spindle 25 which is pointed, and which is, as shown in Figs. 1 and 4, adapted to be seated in a corresponding conical socket of the mandrel 13. While, however, the extension 5 is preferably rigid with the bearing bracket 3 at the left hand end, the extension 24 forms a part of an oscillating bracket as illustrated in Figs. 5 and 7. A pivot pin 26 vertically secured in the base of the structure 11 serves for rotatably supporting the bracket 27 with which the tail bearing 24 is firmly united. It will be seen, therefore, that the tail bearing may be swung about the axis of the pivot 26 to facilitate the release of the mandrel 13 from its operative position, whereby then upon withdrawal of the plug from the stub shaft 12 the mandrel with the saxophone body secured thereto may be removed from the stub shaft. The reverse operation may be effected when it is desired to place a new mandrel with an instrument body mounted thereon into operative position and to rapidly place the mandrel in a position in which the rotation of the same can be effected.

In order to quickly effect the release of the support for the instrument body from this tail bearing, the bracket 27 is spring controlled, as may be seen from Figs. 5 and 7.

A link 40 is pivotally secured to the side of the bracket at 41 and is controlled by a spring 42 which is connected to the free end of the link, having its other end anchored at 43 in an arm 44 which is secured to the back of the bearing structure 11 at 46.

The spring 42 will normally have a tendency to maintain the bracket 27 in operative position, as shown in Fig. 7. If, however, the operator swings the bracket by means of the handle 45 about the pivot pin 26 the spring 42 will at the beginning resist this pivotal movement until the pivot 41 is moved to the other side of the pin 26, whereupon the spring 42 will have a tendency to continue the swinging movement of the bracket 27 until the terminal position of this bracket, that is, the open position of the bearing structure has been reached. The spring 42, therefore, has the tendency to retain the bearing bracket 27 yieldingly in either one of its terminal positions and to prevent the stoppage of the bearing bracket 27 in any intermediate position.

The slanting head of the structure 11 also carries a bearing 29 which like the bearing 7 on the other structure 3 may be adjusted thereon and which is constructed as an ordinary bearing with a removable cap so as to facilitate the insertion or removal of that shaft which is rotatably supported in these bearings.

The two bearings 7 and 29 are utilized for rotatably supporting a gauge carrying shaft 30, on which a plurality of gauge plugs 31 are removably mounted.

As it is the intention by means of the plugs to gauge the proper position of the knobs 32 fastened to the outside of the instrument body, and as the saxophone body is tapering towards one end, the height of the gauge plugs also must increase from one end of the shaft 30 towards the other end, as will be clearly seen from Fig. 4. Owing to the peculiar distribution of these knobs 32 on the saxophone body, some of the gauges, as for instance, illustrated in Fig. 8, may be utilized for gauging a pair of cross knobs which are closely adjacent to each other and which are in alinement circumferentially with each other. The plug 31′, as illustrated in Fig. 8, is therefore provided with extensions 33′ which are circumferentially spaced from each other while the ordinary gauge plug 31, as illustrated in Figs. 6 or 10, carries a single extension 33 only. This extension, as will be seen from Figs. 4 and 10, is bifurcated, the distance between the two prongs being just sufficient to accommodate the head of the knob 32, whose position is to be gauged.

It will also be understood from the above that for gauging or testing of a saxophone body of a certain type, that is, having a predetermined length and having the knobs arranged in predetermined more or less regular circumferential rows and axial series, a gauge carrying shaft 30 with an equivalent arrangement of the gauge plugs 31 may be utilized and hence it will be feasible to rapidly gauge a large number of saxophone bodies of the same type in succession, or to effect an exchange of the shaft 30 in the bearings 7 and 29 when a saxophone body of a different type but of the same length has to be tested. It is also obvious that by adjustment of the bearing brackets 3, 11 relatively to each other on the bed 1 of the machine, saxophone bodies, of different length may be subjected in rapid succession to the gauging operation in the machine.

For effecting a simultaneous rotation of the instrument body 14 and the gauge carrier 30, and in the same direction, a gear train is provided and comprises the gear 51 fixed to the stub shaft 12, said gear meshing with the idler gear 52, suitably mounted for rotation in the bracket 3, said idler gear meshing with the gear 53 which is rigidly connected with the end of the gauge carrier 30 adjacent the bearing element 7. A hand-wheel 50 is also provided for manually rotating the mandrel 13 upon which the instrument body is mounted, said hand wheel being rigidly connected with the mandrel stub shaft 12 by a headed screw 54 which may serve to rigidly secure both the gear 51 and said hand wheel to the end of the stub shaft 12. A set screw 55 may be used to engage the tail pin 25 to maintain the latter against axial displacement.

I claim:

1. In a machine for gauging the knobs of musical instruments of the character described, the combination of a support for an instrument body, a gauge carrier and means for moving said carrier and body relatively to each other.

2. In a machine for gauging the knobs of musical instruments of the character described, the combination of a support for an instrument body, a gauge carrier, and means for moving said carrier and said body simultaneously, relatively to each other.

3. In a machine of the character described, the combination of a support for an instrument body, a gauge carrier and means for rotating said carrier and support simultaneously.

4. In a machine of the character described, the combination of a support for an instrument body, a gauge carrier, means for retaining said instrument body in predetermined position on said support, and means for imparting a rotary movement to said support and to said gauge carrier in the same direction.

5. In a machine of the character described, the combination of a support for an instrument body, a gauge carrier, and means for imparting movement to both said body and said carrier, said carrier being adjustable transversely of its own axis in the machine.

6. In a machine of the character described, the combination of a support for an instrument body, a gauge carrier and means for moving said gauge carrier relatively to said body, said carrier being adjustable transversely of the axis of the instrument body.

7. In a machine of the character described, the combination of a machine bed, a support for an instrument body, a gauge carrier, a support for said gauge carrier held by said first named support, and means for simultaneously adjusting both of said supports longitudinally on the bed.

8. In a machine of the character described, the combination of a support for an instrument body, a bearing for said support, and means for rotatably positioning said bearing about an axis at an angle to the axis of the instrument.

9. In a machine of the character described, a support for an instrument body, bearings adapted to maintain the axis of said body in a horizontal plane, and means for rotatably adjusting one of the bearings about a vertical axis.

10. In a machine of the character described, the combination of a mandrel for an instrument body, a bearing pin adapted to engage said mandrel, a support for said bearing pin, and a vertical pivot about which the support is oscillatable.

11. In a machine of the character described, a bearing for the mandrel of an instrument body, including a bearing pin, a bracket oscillatable about an axis at right angle to the axis of the pin and supporting the pin, and means for normally retaining the bracket in a predetermined position.

12. In a machine of the character described, the combination of a bearing pin for the mandrel of an instrument body, a bracket in which said bearing pin is mounted, a pivot about which the bracket is oscillatable, and a spring operatively associated with said bracket for holding the same in either one of two terminal positions.

13. In a machine of the character described, the combination with a bearing for a mandrel of an instrument body, a bearing pin, a bracket in which said pin is supported, a pivot about which the bracket is oscillatable, a link secured to the bracket, an arm attached to the bearing and a spring inserted between said link and said arm, adapted to retain the oscillatable bracket in either terminal position, and for preventing stoppage of the bracket anywhere between the terminal positions.

14. In a support for an instrument body, a shaft, a mandrel on which the body is seated, said mandrel being mounted on said shaft, and a plug radially extending through said body, shaft and mandrel and adapted to prevent displacement of the parts relatively to each other.

15. In a support for an instrument body, a mandrel on which the body is seated, the mandrel having a cylindrical opening, a shaft inserted into the opening, the mandrel also being provided with a radial bore, the shaft having a radial bore in axial alinement therewith but of smaller diameter, and a plug, the plug being provided with a portion fitting the bore of the shaft and another portion to fit the bore of the mandrel.

16. In a support for an instrument body, a mandrel on which the body is seated, a shaft supporting the mandrel and coaxial therewith, a plug extending through said mandrel and shaft, and means in said shaft for preventing axial movement of said plug without accompanying rotary movement.

17. In a support for an instrument body, a mandrel on which the instrument body is seated, a shaft in axial alinement with the mandrel and supporting the mandrel, said shaft, mandrel and body being provided with coaxial openings extending radially through the parts, a plug fitted in said openings and having a threaded portion at its inner end, and a screw axially seated in said shaft and adapted to engage the threaded portion of said plug.

In witness whereof I have hereunto affixed my signature this 2d day of November, 1922.

EDWARD J. GULICK.